Dec. 30, 1969   H. SINCLAIR   3,487,422
FORWARD AND REVERSE DRIVE MACHINERY
Filed May 10, 1968   8 Sheets-Sheet 1

United States Patent Office 3,487,422
Patented Dec. 30, 1969

3,487,422
FORWARD AND REVERSE DRIVE MACHINERY
Harold Sinclair, London, England, assignor to Synchro-Drive Limited, London, England
Filed May 10, 1968, Ser. No. 728,223
Claims priority, application Great Britain, May 15, 1967, 22,494/67
Int. Cl. F16h 41/22
U.S. Cl. 60—102                                    10 Claims

ABSTRACT OF THE DISCLOSURE

In an ahead and astern drive marine propulsion system wherein a hydraulic turbo coupling is included in the ahead drive path and in the astern drive path, the working circuits of the turbo couplings being selectively filled and emptied to establish ahead or astern drive, the means for controlling the filling/emptying of the working circuits have a setting in which the working circuits of both turbo couplings are filled, so that the torques developed by the turbo couplings are substantially equal and are in opposition whereby a strong braking effort is applied to the propeller.

Change-over between ahead and astern drive involves passage of the control means through the said setting so that the previously empty turbo coupling is filled whilst its rotors are rotating in opposite directions, and the previously full turbo coupling is then emptied whilst its rotors are rotating in opposite directions. Torque surges in the turbo couplings are thereby avoided.

The control means also have a position in which both turbo couplings are empty, to permit of a high idling speed of the driving member, e.g. a gas turbine, and the control means also have a slow speed ahead setting in which the ahead drive turbo coupling is full and the astern drive turbo coupling is partially full, and a slow speed astern setting in which the astern drive turbo coupling is full and the ahead drive turbo coupling is partially full.

---

This invention relates to forward and reverse drive rotary machinery for use with a unidirectional driving member, e.g. a turbine, the machinery incorporating a first hydraulic turbo coupling in a forward drive path and a second hydraulic turbo coupling in a reverse drive path such that the torque developed by either turbo coupling when its working circuit is filled is in opposition to the torque developed by the other turbo coupling when its working circuit is filled the turbo couplings each being of the type comprising at least one pair of vaned rotors which are arranged as an impeller and a runner respectively and which define a working circuit wherein during normal operation of the turbo coupling liquid in the form of a vortex ring transmits power from one rotor to the other, the machinery also incorporating control means for selectively effecting the filling/emptying the working circuit of the forward drive turbo coupling or of the reverse drive turbo coupling as the case may be to establish forward drive of the driven member of the machinery via the forward drive turbo coupling or reverse drive of the driven member via the reverse drive turbo coupling.

The invention relates particularly but not exclusively to marine propulsion reversing gearing of high power and speed wherein the said first and second turbo couplings are arranged for ahead and astern drive of the propeller respectively.

One object of the invention is to control the fillings of the turbo couplings in such manner as to be strongly effective when rotating at high speed, during the change-over period between forward and reverse drive, in reducing the speed of the driving and driven members of the machinery, whereby in the case of the application of the invention to marine propulsion reversing gearing rapid retardation of the propeller to a low speed with consequently more rapid retardation of the vessel can be achieved than would be the case without the powerful propeller braking action of the turbo couplings.

Another object of the invention is to avoid the occurrence of torque surges within the turbo couplings and connected machinery such as are normally created by temporary conditions of instability of the vortex ring of liquid when one turbo coupling or the other is passing through a partly filled condition of its working circuit while the impeller and runner are rotating at high speed in the same direction and with torque being transmitted from one of the rotors to the other under an operating condition of high percentage slip in the partially filled turbo coupling.

In accordance with the invention there is provided forward and reverse drive rotary machinery for use with a unidirectional driving member, the machinery incorporating a first hydraulic turbo coupling in a forward drive path and a second hydraulic turbo coupling in a reverse drive path, such that the torque developed by either turbo coupling when in rotation with its working circuit filled is opposed by the torque developed by the other turbo coupling when in rotation with its working circuit filled, the turbo couplings each being of the type comprising at least one pair of vaned rotors which are arranged as an impeller and a runner respectively and which define a working circuit wherein during normal operation of the turbo coupling liquid in the form of a vortex ring transmits power from one rotor to the other, the machinery also incorporating control means for selectively effecting the filling/emptying of the working circuit of the forward drive turbo coupling or of the reverse drive turbo coupling to establish selectively forward drive of the driven member of the machinery via the forward drive turbo coupling or reverse drive of the driven member via the reverse drive turbo coupling, the said control means having settings that include a forward drive setting in which the working circuit of the forward drive turbo coupling is substantially full to transmit torque from the driving member to the driven member and the working circuit of the reverse drive turbo coupling is effectively empty, a reverse drive setting in which the working circuit of the reverse drive turbo coupling is substantially full to transmit torque from the driving member to the driven member and the working circuit of the forward drive turbo coupling is effectively empty, and an additional setting in which the empty working circuit can fill and the full working circuit remains full, a change between said forward drive setting and said reverse drive setting involving passage of said control means through said additional setting.

It is a feature of the invention that when the control means are moved from the additional setting, wherein the working circuits of both of the turbo couplings are substantially full of working liquid to the forward drive setting, the said movement of the control means effects the emptying of the reverse drive turbo coupling while the forward drive turbo coupling remains substantially full, and conversely the movement of the control means from the said additional setting to the reverse drive setting effects the emptying of the forward drive turbo coupling while the reverse drive turbo coupling remains substantially full.

Preferably, the turbo couplings are of the type that are capable of rapid emptying of the working circuit such that the movement of the control lever from the said neutral power setting to the forward drive or reverse drive setting, as the case may be, is effective in rapidly applying the power of the driving member to the driven member in the respective forward drive or reverse drive direction. Consequently it is not necessary to provide a liquid filling pump of large capacity to achieve the desirable rapid rate of application of power in the selected driving direction.

In British patent specification No. 384,022 it is explained that under certain conditions of operation of a partially filled turbo coupling when transmitting torque, violent fluctuations may occur in the value of the transmitted torque, due to instability of the vortex ring of liquid within the working circuit when in the partially filled condition with the impeller and runner rotating at high speed in the same direction and transmitting torque within a certain relative speed range corresponding with high percentage slip in the coupling. For example, when the driving member of the machinery is rotating at relatively high speed and power output, and the driven member is accelerated from rest by admitting working liquid to the working circuit of the turbo coupling, or on the other hand when the rotational speed of the driven member is reduced by withdrawing liquid from the working circuit of the turbo coupling, then within a certain relative speed range of the impeller and runner of the partially filled turbo coupling corresponding with the transmission of torque at a high percentage slip, when the impeller and runner are rotating in the same direction, undesirably high torque surges will occur.

On the other hand such torque surges do not occur when the turbo coupling is passing through a partially filled operating condition and is transmitting torque with the impeller and runner rotating in opposite directions.

In order to eliminate the said instability of the vortex ring of working liquid or to reduce it to an unimportant value, the said patent specification teaches the interruption of the smooth boundary of the working circuit of the turbo coupling by the provision of a sudden discontinuity so located in the working circuit as to impede the circulation of a high velocity vortex ring but to offer little obstruction to the normal circulation of the liquid of low velocity when at low values of slip.

In forward and reverse drive machinery according to the present invention the working circuits of both turbo couplings are preferably of high torque transmitting capacity, being substantially devoid of such discontinuities, and transitional operation of either turbo coupling in the foregoing working conditions such as would give rise to violent torque fluctuations is avoided by the feature that in the said additional setting of the control means the working circuits of both turbo couplings are substantially full, and forward and reverse drives are respectively established by emptying the working circuit of the reverse or forward drive turbo coupling, with the working circuit of the other turbo coupling remaining substantially full.

Since the provision of sudden discontinuities as above mentioned limits the torque capacity of a turbo coupling, the substantial omission of such discontinuities from the working circuits of the turbo couplings used in machinery according to the present invention enables the diameter, length and weight of the turbo couplings, for specific conditions of horsepower, rotational speed, and percentage slip, to be reduced as compared with conventional practice in turbo couplings of the variable filling type, whilst nevertheless a high stalling torque is obtained in each coupling such that in the said additional setting of the control means with both working circuits substantially full and the power of the driving member reduced, the high torque developed within the turbo couplings, which are geared in torque opposition, exerts a powerful barking action whereby to reduce rapidly the rotational speed of the system and dissipate most of the kinetic energy of the driving and driven members of the machinery.

An embodiment of the invention, as applied to a marine propulsion system for the maneuvering of a vessel driven by a unidirectional turbine, is illustrated in the accompanying drawings, in which.

Referring to the drawings, the turbo couplings in the ahead and astern gear trains are of similar construction, and only the ahead drive turbo coupling will be described in detail, the astern drive turbo coupling being marked with reference numerals which are the same as those used for corresponding parts of the ahead drive turbo coupling except that they are provided with indices.

Figure 1:
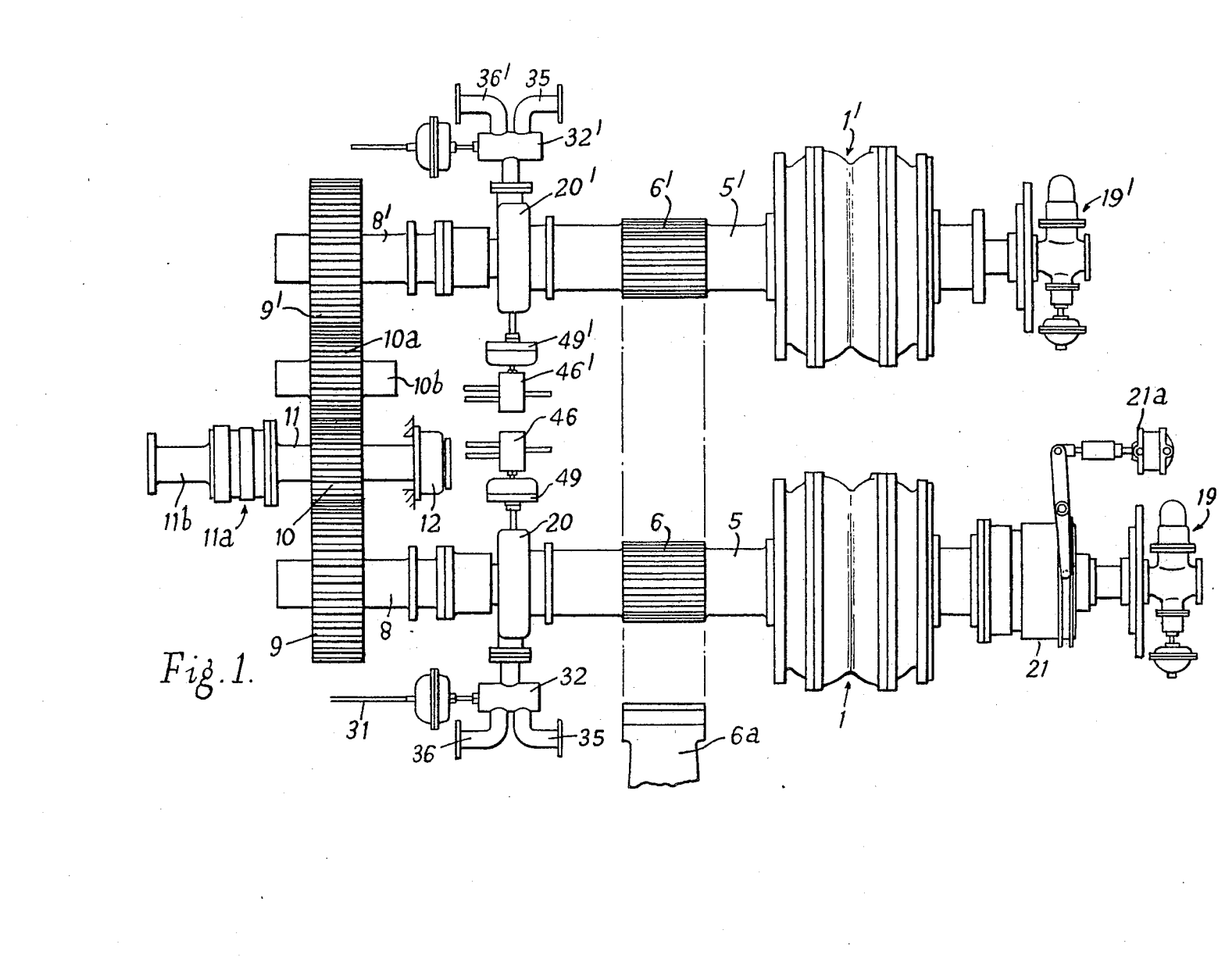
FIGURE 1 shows the layout of ahead drive and astern drive turbo couplings and associated shafts and gearing.
Figure 2:
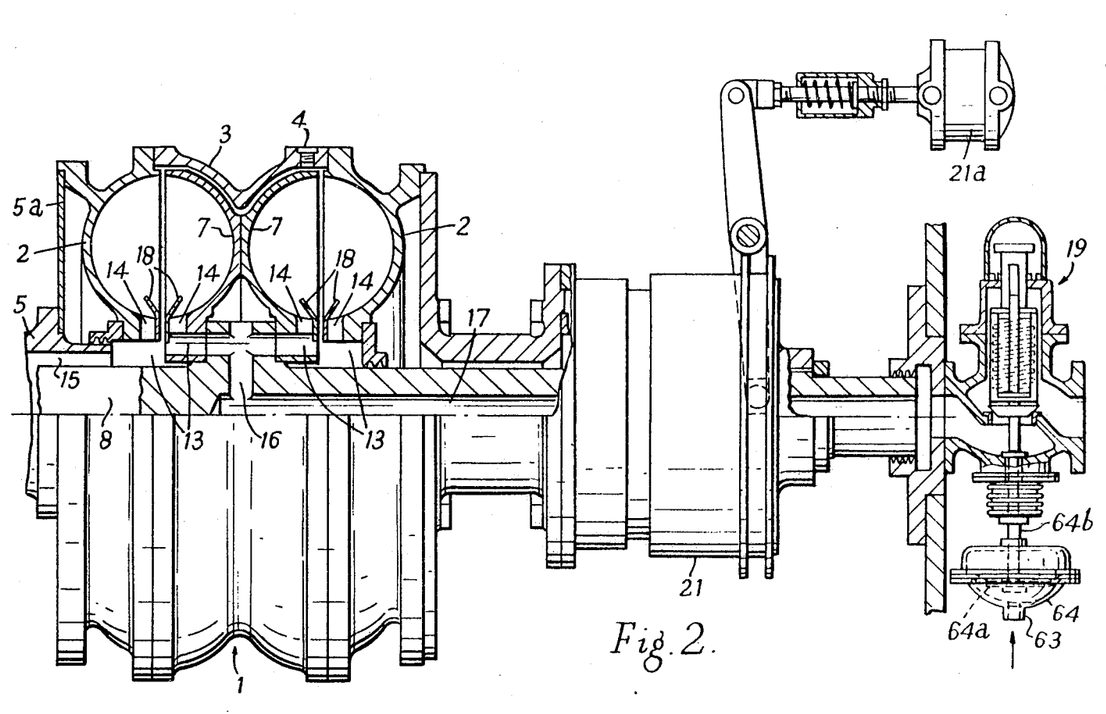
FIGURE 2 is a view, partly in section and on a larger scale than FIGURE 1 showing the ahead drive turbo coupling, a lockable clutch arranged in parallel with the turbo coupling, and a liquid circulation valve.

The ahead drive turbo coupling, shown in FIGS. 1 and 2 and indicated generally at 1, is of the double circuit type and comprises a pair of vaned rotors 2 interconnected for rotation together by a casing 3 provided with conventional restricted leak-off nozzles one of which is shown at 4. The casing 3 is drivably connected via a driving plate 5a to a sleeve shaft 5 formed integrally with an ahead drive pinion 6. Between the rotors 2 is located a pair of vaned rotors 7 forming a back-to-back rotor structure and associated one with each of the rotors 2 to define a pair of working circuits. The said rotor structure is mounted on a quill shaft 8, constituting an ahead countershaft, which passes through the sleeve shaft 5 and carries an input gearwheel 9 meshing with a high speed pinion 10 on a primary shaft 11 coupled via an overrunning clutch 11a of the synchronous self-shifting type to the shaft 11b of a turbine (not shown), the primary shaft 11 also carrying an anti-back-turning brake 12, of the synchronous self-shifting type having a fixed abutment, its function being to prevent the possibility of reverse rotation of the turbine, e.g., when at low idling power output, which might arise from the negative torque of the overrunning propeller transmitted through the astern or ahead gear train, as the case may be, due to motion of the vessel through the water at relatively high speed.

The input gearwheel 9' on the quill shaft 8' constituting an astern countershaft associated with the astern drive turbo coupling 1' engages with an idler gearwheel 10a on a shaft 10b, the high speed pinion 10 also engaging with the idler gearwheel 10a.

Figure 4:
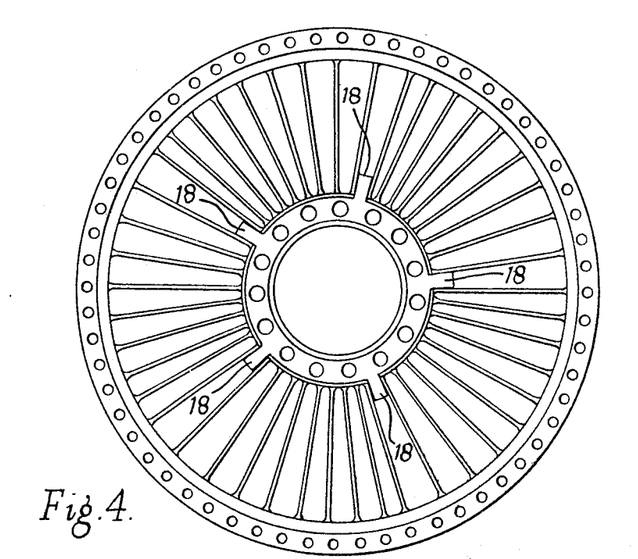
FIGURE 4 is an end view of a coupling rotor, looking on the vanes thereof and showing flow directing guide members.

The vaned rotors 2, 2 and 7, 7 have a plurality of axial filling/emptying ducts 13 spaced uniformly around and closely adjacent the quill shaft 8 and communicating with short radial transfer ducts 14 situated within the inner profile radius of the two working circuits of the turbo coupling. The ducts 13 also communicate with a duct 15 in the annular space between the quill shaft 8 and the bore of the sleeve shaft 5, and also via radial ducts 16 with an axial duct 17 through the extension of the quill shaft 8. Each radial transfer duct 14 is provided with a locally situated flow directing guide member 18 (see also FIG. 4) extending a short distance into the working circuit between the adjacent pair of vanes.

Figure 5:
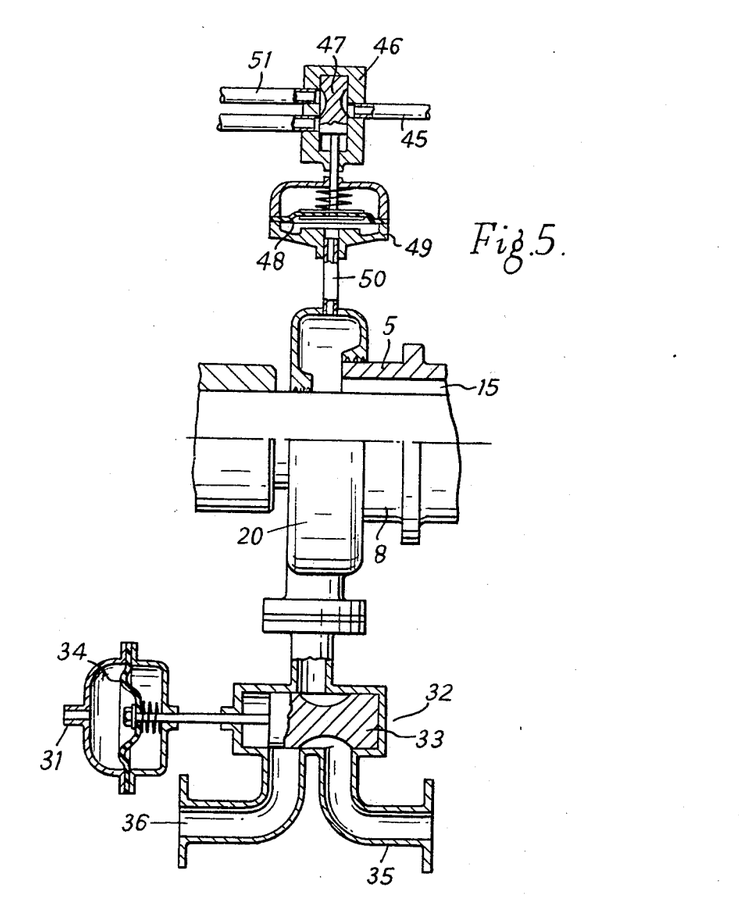
FIGURE 5 is a detail view of valves associated with the ahead drive turbo coupling.

The axial duct 17 communicates with a spring loaded liquid circulation poppet valve 19 the outlet of which returns liquid to a tank (not shown) serving as a reservoir for working liquid. The annular duct 15 communicates with a stationary muff 20 (FIGS. 1 and 5) for filling/emptying the working circuits of the ahead turbo coupling, the muff 20 surrounding the shafts 5 and 8, with liquid seals provided between the muff 20 and the shafts 5 and 8.

A multiple tooth clutch 21 is provided on the extension of the quill shaft 8 (FIG. 2) whereby the shaft 8 can be clutched when required to the ahead drive pinion 6 via the rotors 2, 2, the interconnecting casing 3 and driving plate 5a. The clutch 21 is provided with a servo actuated control 21a for locking it in the engaged condition during normal ahead propulsion viz when the ahead and astern turbo couplings are both inoperative; and the lock is disengaged when the vessel is being maneuvered, i.e. when the ahead and astern turbo couplings are being selectively filled/emptied as required.

The control means for selectively filling/emptying the ahead and astern turbo couplings include a conveniently located manual control lever 22 (FIGURES 6, 7 and 8) movable in fore and aft slots and lateral gates in a quadrant plate 23 and carrying at the lower end the cams 24 and 25 arranged for co-operation with respective spring returned pneumatic control valves 26 and 27, the valve 26 being associated with a liquid control valve of the ahead turbo coupling and the pneumatic valve 27 being associated turbo couplings via the muffs 20 and 20' and the pling. The valve 26 has a port 28 connected to a source of compressed air (not shown) and a port 29 leading to exhaust. In the position shown in FIGURE 6 the piston 30 of the valve 26 is positioned to close the exhaust port 29 and to connect the air supply port 28 to a pipe 31 leading to a diaphragm actuated liquid control valve 32 (FIGS. 1 and 5) the piston 33 of which is shown as positioned, under the action of the air pressure acting on the diaphragm 34, so as to connect the liquid supply/discharge muff 20 to a branch 35 connected by a pipe to a filling pump (not shown) that draws from the aforesaid tank. When the piston of valve 26 connects the pipe 31 to exhaust, thereby relieving the air pressure on the diaphragm 34 of valve 32, the piston 33 of valve 32 moves under the action of a return spring to a position in which the muff 20 is connected to a branch 36 piped to the tank.

The astern turbo coupling 1' is provided with a diaphragm actuated liquid control valve 32' which is similar in construction and operation to the valve 32 associated with the ahead turbo coupling 1 and which is under the control of the pneumatic control valve 27.

The control lever 22 is capable of fore and aft movement in the ahead and astern control slot 37 in the quadrant plate 23. As can be seen from FIGURE 6, when the control lever 22 is in the mid position shown in full lines both valves 26 and 27 are actuated by the cams 24 and 25 to the conditions in which compressed air is fed to the diaphragms of the liquid control valves 32 and 32', which are therefore both in the condition in which working liquid is supplied to the working circuits of the associated turbo couplings via the muffs 20 and 20' and the annular ducts 15 and 15'. In these conditions there is a continuous circulation of working liquid through a cooler (not shown) through the working circuits of the turbo couplings, entering through the annular ducts 15 and 15' and discharging to the tank through the spring loaded poppet valves 19 and 19', whereby a full condition of the respective working circuits is ensured.

Figure 6:
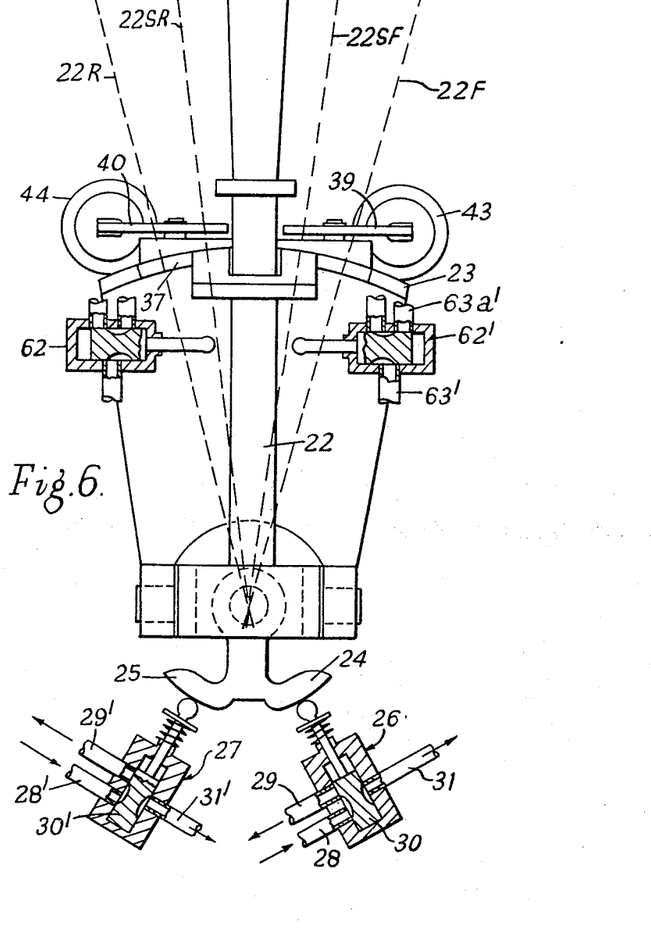
FIGURE 6 is a view, partly in section, showing a control lever and associated valves and detents.

When the control lever 22 is moved in the slot 37 to the ahead setting, indicated in FIGURE 6 by the right-hand broken line 22F (and also in FIGURE 9B), the cam 25 moves off the tappet of valve 27 but the cam 24 remains in engagement with the tappet of valve 26. Hence the valve 32' associated with the astern drive turbo coupling 1' connects the working circuits of this turbo coupling via branch 36' to the tank, and these working circuits (being in the stalled or nearly stalled condition) empty rapidly to the tank, but the valve 32 associated with the ahead drive turbo coupling 1 remains in the condition shown in FIGURE 5, such that the working circuits of the ahead drive turbo coupling 1 remain full, thus establishing ahead drive of the propeller.

Conversely, when the control lever 22 is moved to the astern setting, indicated in FIGURE 6 by the left-hand broken line 22R (and also in FIGURE 9C), the working circuits of the ahead drive turbo coupling 1 empty to the tank but the working circuits of the astern drive turbo coupling 1' remains full, thereby establishing astern drive of the propeller.

Figures 7, 8:
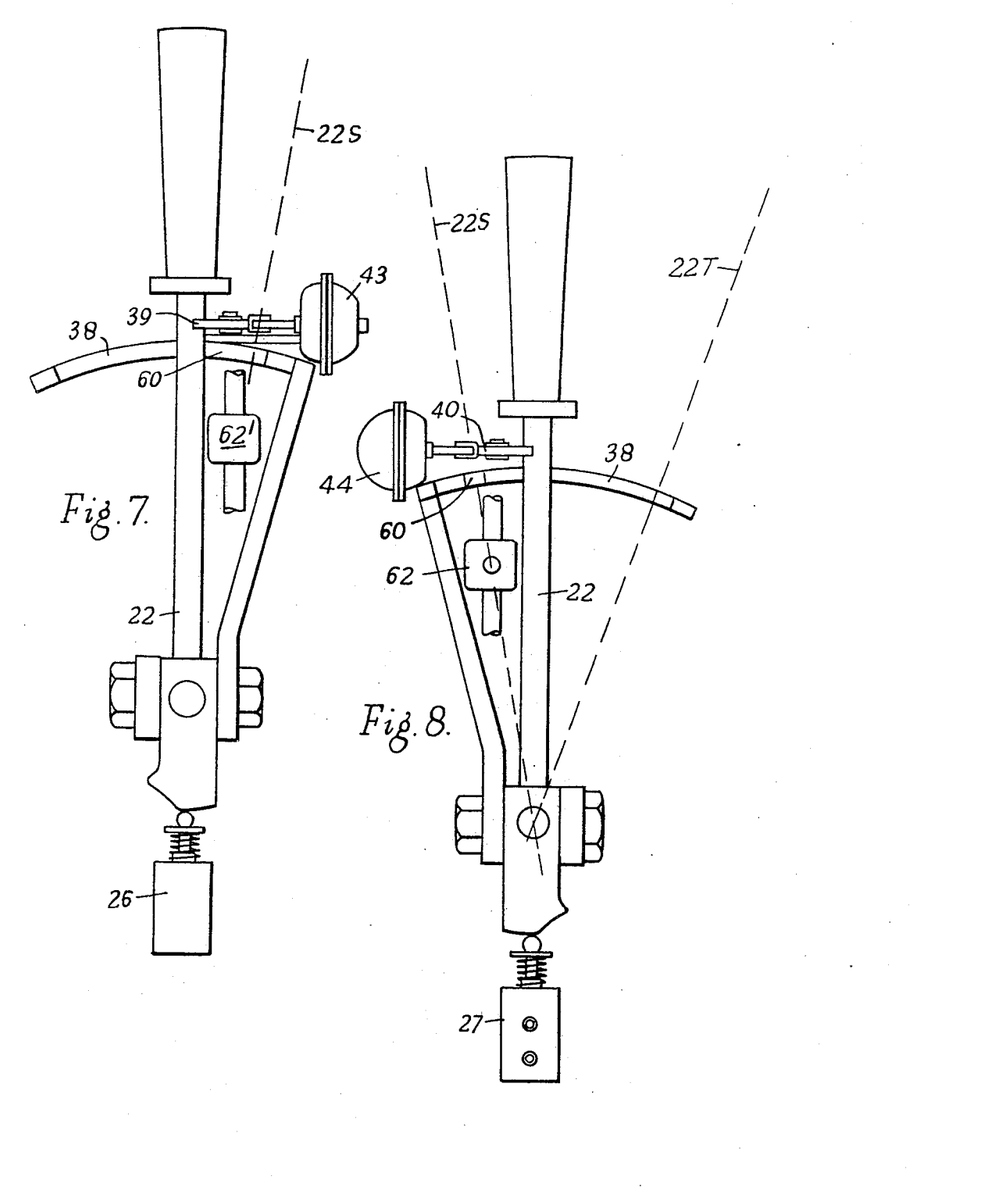
FIGURE 7 is a view of the control lever and associated parts, as seen from the right-hand side of FIGURE 6.
FIGURE 8 is a view of the control lever and associated parts, as seen from the left-hand side of FIGURE 6.

The quadrant plate 23 has a gate 38 opening at right angles into the slot 37 at the centre thereof, so that when the lever 22 is in the mid position in the slot 37 it may be moved laterally in the gate 38 to the position indicated by the right-hand broken line 22T in FIGURE 8. In moving the lever to this neutral setting both cams 24 and 25 release their associated valves 26 and 27, which therefore assume the condition, under the action of their return springs, in which the air pressure acting on the diaphragms of the liquid control valves 32 and 32' is relieved, and the working circuits of both the ahead drive and the astern drive turbo couplings can empty to the tank.

Figure 9A:
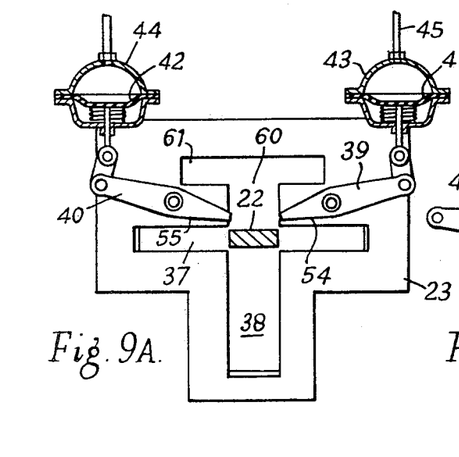
FIGURE 9A shows a quadrant plate and associated diaphragm operated detents, with the control lever in an "ADDITIONAL" setting.

The settings of the control lever 22 as described in the foregoing thus include the following:

(1) ADDITIONAL. The control lever 22 is in the mid position in the quadrant slot 37 as shown in full lines in FIGURE 6, and also in FIGURE 9A. The working circuits of both turbo couplings are full, and working liquid that is circulated for cooling purposes through the working circuits by the pump is returned to the tank through the poppet valves 19 and 19'.

(2) AHEAD. The control lever 22 is in the ahead setting indicated by the right-hand broken line 22F in FIGURE 6, and shown in FIGURE 9B. The working circuits of the ahead drive turbo coupling 1 are full and the working circuits of the astern drive turbo coupling 1' are empty.

(3) ASTERN. The control lever 22 is in the astern setting indicated by the left-hand broken line 22R in FIGURE 6, and shown also in FIGURE 9C. The working circuits of the ahead drive turbo coupling are empty and the working circuits of the astern drive turbo coupling are full.

(4) NEUTRAL. The control lever 22 is moved laterally in the gate 38 to the setting indicated by the broken line 22T in FIGURE 8, and shown also in FIGURE 9D. The working circuits of both turbo couplings are empty, and the turbine and primary reduction gearing can be operated with the final reduction gearing and the propeller stationary, so that the turbine can be run for test purposes without driving the propeller; and likewise can be used, when in port, for driving an auxiliary machine, e.g., an electric generator or a pump.

Figure 9B:
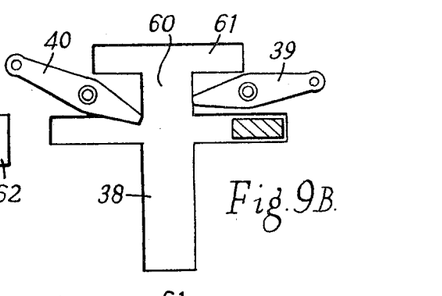
FIGURES 9B and 9D show different settings of the control lever in the quadrant plate and corresponding positions of the detents.
Figure 9C:
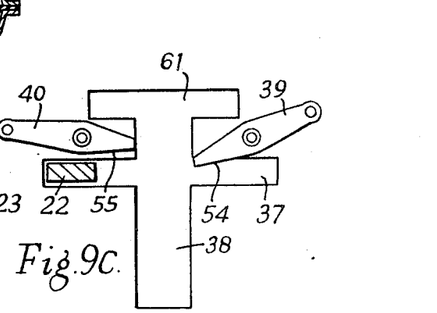

There are associated with the quadrant plate 23 and slot 37 two pivotally mounted mechanical detents 39 and 40, one on each side of the mid fore-and-aft position. The purpose of these detents is temporarily to arrest movement of the control lever 22 through or from said additional position, e.g., when it is being moved from the AHEAD setting to the ASTERN setting, or vice versa. The object of temporarily arresting such movement is to introduce a short time delay to permit filling of the working circuits of the astern drive turbo coupling or of the ahead drive turbo coupling as the case may be to ensure the achievement of the desired intermediate conditions wherein the working circuits of both turbo couplings are substantially full. The detents 39 and 40 are under pneumatic control by diaphragms 41 and 42 respectively which are located in closed casings 43 and 44. The casing 43 is connected via a pipe 45 to the outlet side of a diaphragm actuated pneumatic valve 46 (FIG. 5), the piston 47 of which is controlled by liquid pressure acting on the spring returned diaphragm 48 located in a closed casing 49 connected by a pipe 50 to the muff 20. The completion of the filling of the working circuits of either turbo coupling is accompanied by a marked rise in the pressure of the working liquid in the inlet ducts of the turbo coupling, viz, when the respective circulation valve 19 or 19' opens against the pressure of the return spring. In the case of the ahead drive turbo coupling this increased pressure acts on the diaphragm 48 to move the piston 47 to the position shown in FIGURE 5, in which the pipe 45 is connected by a pipe 51 to the source of compressed air, the effect of which is that air pressure on the diaphragm 41 moves it against the action of its return spring and turns the detent 39 out of the path of the control lever 22, which is then free to be moved in the quadrant slot 37 to the AHEAD setting (FIG. 9B). A valve 46' similar in construction and operation to the valve 46 is associated with the astern drive turbo coupling to move the detent 40 out of the path of the control lever 22 in the quadrant slot 37 when the working circuits of the astern drive turbo coupling 1' are substantially full, so that the control lever 22 is then free to be moved to the ASTERN setting (FIGURE 9C).

Figure 9D:
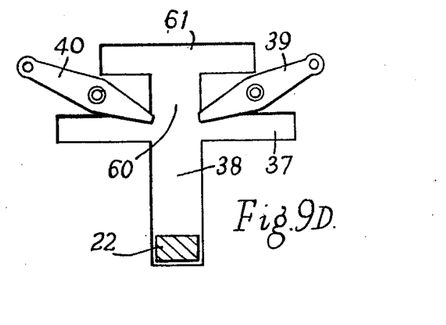

When it is required to run the turbine, e.g., for test purposes, with the remainder of the machinery at a standstill, the control lever 22 is moved laterally in the gate 38 to the NEUTRAL position shown in FIGURE 9D whereby liquid in the working circuits of both turbo couplings can empty via control valves 32 and 32' to the tank. When the control lever 22 is moved laterally from the NEUTRAL setting back to the ADDITIONAL setting, the cams 24 and 25 engage the tappets of valves 26 and 27, and the working circuits of both turbo couplings commence to be filled. However, both detents 39 and 40 will be effective to prevent the control lever 22 from being moved to either the AHEAD or ASTERN setting until the working circuits of both turbo couplings are substantially full and the increased pressure of working liquid in the filling ducts of the turbo couplings causes both detents 39 and 40 to be withdrawn automatically under the action of the valves 46 and 46' and the diaphragms 41 and 42. The control lever 22 may then be moved to the AHEAD setting or the ASTERN setting as required, and the turbine power increased to rotate the propeller in the ahead or estern direction respectively.

To permit the control lever 22 being moved from the AHEAD or ASTERN setting to the ADDITIONAL or NEUTRAL setting in circumstances in which the compressed air supply is not operative, the detents 39 and 40 are formed with chamfered surfaces 54 and 55 respectively such that the control lever 22 can push the respective detent out of its path by engaging the chamfered surface in the manner of a latch.

During ahead propulsion by the ahead drive turbo coupling the rotors of the empty astern turbo coupling are rotating in opposite directions. When it is desired to change to astern drive, the turbine power is reduced to idling and the control lever 22 is moved to the ADDITIONAL setting, in which filling of the working circuits of the astern drive turbo coupling 1' is effected with the rotors thereof turning in opposite directions, which ensures stable conditions of the liquid vortex rings in the said working circuits, while the working circuits of the ahead drive turbo coupling remain full; and thus without torque fluctuations arising in the turbo couplings.

Hence under the aforesaid circumstances a stalled or nearly stalled condition of the two turbo couplings is reached, because the high torque developed by one coupling is opposed by the high torque developed by the other coupling, and the high torque due to both turbo couplings is opposed to the overrunning torque at the final reduction gearwheel 6a (FIGURE 1) such as arises from the continued rotation of the propeller in consequence of relatively fast movement of the vessel through the water.

After a short time interval viz. when permitted by the withdrawal of the detent 40, during which the continued braking action of the substantially stalled ahead and astern drive turbo couplings geared to the propeller shaft serves to increase the normal retardation of the vessel, the control lever 22 is actuated to empty the working circuits of the ahead drive turbo coupling, while the working circuits of the astern drive turbo coupling remain full; whereupon the turbine power is increased to rotate the propeller via the astern drive turbo coupling 1'.

A converse change from astern drive to ahead drive similarly involves setting the control lever 22 to the ADDITIONAL position, in which the working circuits of the ahead drive turbo coupling are filled when the rotors thereof are turning in opposite directions, hence under stable conditions of filling with working liquid, while the working circuits of the astern drive turbo coupling remain full; hence without torque fluctuations arising in the turbo couplings. After a short time interval, when permitted by the withdrawal of the detent 39, the control lever 22 is moved to the AHEAD setting to empty the working circuits of the astern drive turbo coupling 1', while the working circuits of the ahead drive turbo coupling remain full.

In the case of a marine gas turbine manoeuvring gear that includes a gas generator associated with a separate power turbine, the manoeuvring operations will from time to time require the turbine to be at idling power output, with the gas generator operating at low speed to give a suitably low speed of the propeller. Under these conditions however, there may be an undesirable time delay when an order is given calling for a rapid increase in propeller speed, for the reason that the speed of the gas turbine has to be increased, and the power output of the turbine correspondingly raised, before the propeller speed attains the required higher value. To obviate the effect of such time delay the idling speed of the gas generator has to be kept relatively high, whereas on the other hand it is desirable at such times for the propeller to be rotatable at a slow speed, either ahead or astern as the case may be.

To meet the foregoing manoeuvring requirements a separate slot is provided in the quadrant plate 23 for further settings, viz., slow speed ahead and slow speed astern settings of the control lever 22, and valve means as described below are provided whereby the working circuits of both turbo couplings are connected to the filling pump through the valves 32 and 32' but the spring loaded poppet valve 19' or 19 of one or the other of the turbo couplings is opened widely when the control lever is in the above-mentioned slow speed ahead or slow speed astern setting respectively. The effect of widely opening the poppet valve 19 or 19' is to increase the liquid circulation rate through the respective turbo coupling 1 or 1', and to establish a reduced degree of filling of the working circuits thereof.

Consequently, the torque transmitting capacity of the partly filled turbo coupling is reduced and the excess of torque transmitted by the other turbo coupling having the substantially full working circuit is sufficient to rotate the propeller at a desirably reduced speed.

Upon returning the control lever 22 to the mid position in the said separate slot both the turbo couplings will be full, such that the torque transmitted by the ahead and astern drive turbo couplings will be substantially equal and opposite, such that the drive to the propeller will cease, while the gas generator and the turbine continue in rotation at high idling speed in readiness for rapid execution of the next movement order.

Figure 3:
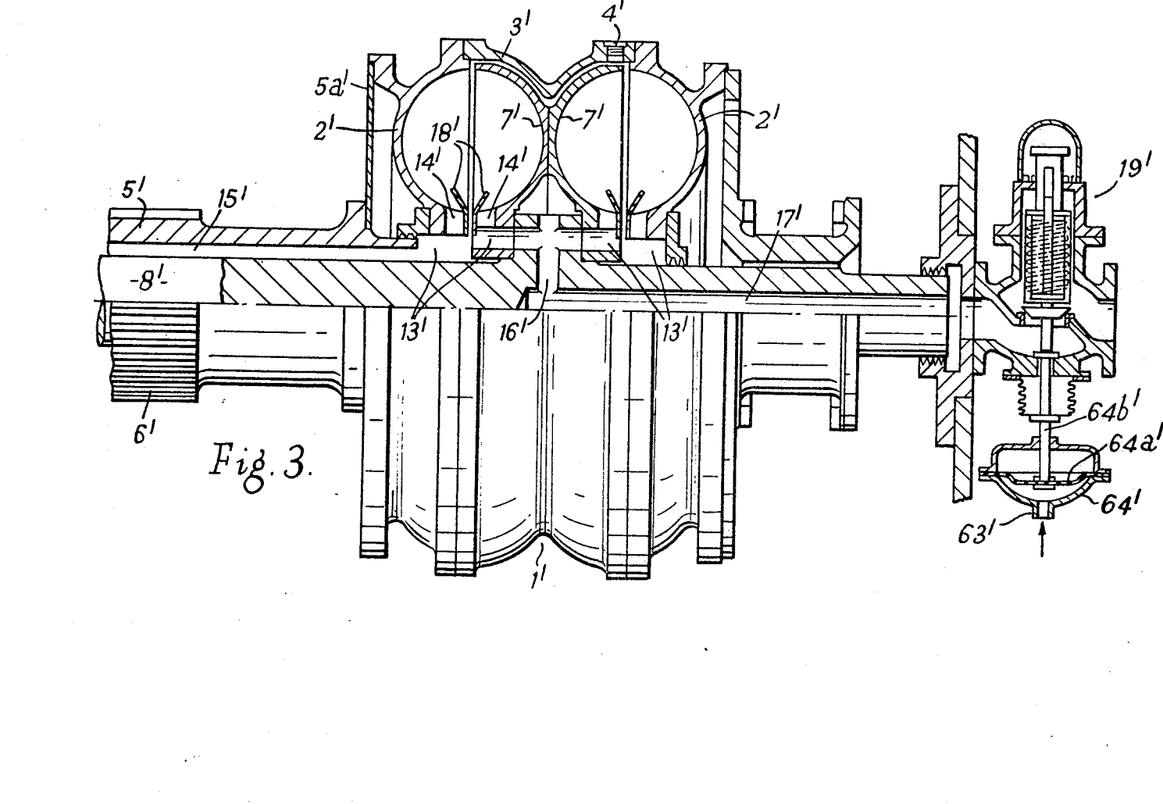
FIGURE 3 is a view similar to FIGURE 2, showing the astern drive turbo coupling and an associated liquid circulation valve.
Figure 10:
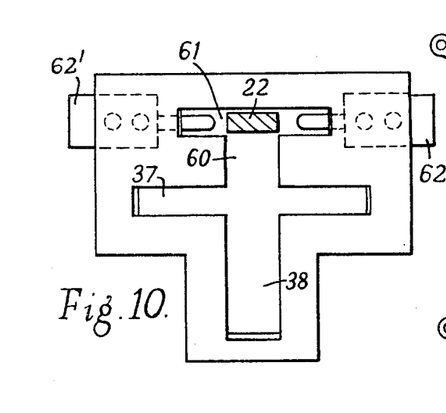
FIGURE 10 shows the quadrant plate and valves associated therewith for providing slow speed settings of the control lever.

Reverting to FIGURES 9A to 9D and FIGURE 10, the quadrant plate 23 has an additional gate 60 opening into the ahead and astern quadrant slot 37 at the mid fore and aft position, such that when the control lever 22 is in the ADDITIONAL setting it can be moved laterally in the gate 60 to the position shown in FIGURE 10. The gate 60 communicates with the short quadrant slot 61 in which the control lever 22 is movable in the fore and aft direction. When moved to the right in FIGURE 10 to the SLOW AHEAD setting indicated by the broken line 22SF in FIG. 6, it engages the tappet of a pneumatic valve 62' and shifts the piston thereof so as to connect a pipe 63' to a pipe 63a' connected to a source of compressed air. The pipe 63a' leads to a closed chamber 64' (FIGURE 3) with a diaphragm 64a' therein carrying a rod 64b' which, when compressed air is applied to the diaphragm 64a', opens widely the spring loaded poppet valve 19' for the purpose described above.

When the control lever 22 is returned to its mid position in the short quadrant slot 61 (FIGURE 10), a spring returns the piston of valve 62' to the position shown in FIGURE 6, in which the pipe 63' is connected to exhaust and the diaphragm 64' is relieved of pressure, so that the poppet valve 19' partially closes and the normal back pressure condition is established within the working circuit, creating the substantially full condition. When the control lever 22 is moved to the left in FIG. 10 in the quadrant slot 61 to the SLOW ASTERN setting indicated by the broken line 22SR in FIG. 6, it actuates a valve 62, similar to the valve 62', causing the spring loaded poppet valve 19 of the ahead drive turbo coupling to open widely whereby to reduce the degree of filling of the ahead drive turbo coupling and reduce its torque transmitting capacity as described in the foregoing.

When the control lever 22 is returned to its mid position in the quadrant slot 61, the poppet valve 19 partially closes and re-establishes the substantially full condition of the working circuit of the ahead turbo coupling. In consequence, the torques transmitted by the ahead and the astern drive turbo couplings will be substantially equal and opposite, such that the drive to the propeller will cease.

Figure 11:
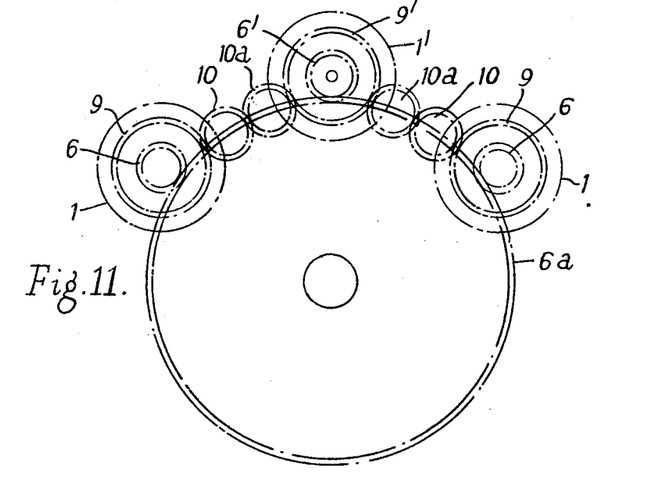
FIGURE 11 is an end view of shafts and gearing of a marine propulsion system in which two turbines are geared to a single propeller shaft.

Whereas FIGURE 1 shows the arrangement of the mechanism for use with a single gas turbine, FIGURE 11 shows the arrangement of the mechanism for use with two gas turbines, viz. port and starboard, each coupled to a pinion 10 and capable of driving the final reduction gearwheel 6a in the ahead or the astern direction as the circumstances may require.

In each case, the ahead drive gearing comprises a high speed pinion 10 meshing with the forward rotation gearwheel 9 drivably connected via an ahead drive turbo coupling 1 and pinion 6 meshing with the final reduction gearwheel 6a for ahead rotation of the propeller.

The astern drive gearing for either or both of the gas turbines includes two idler gearwheels 10a driven by the high speed pinions 10, both idler gearwheels meshing with the reverse drive gearwheel 9' associated with the astern drive turbo coupling 1' and pinion 6' meshing with the final reduction gearwheel 6a for astern rotation of the propeller.

When two gas turbines are in operation together for astern drive, their power output would be reduced at least 50% each to correspond with the torque rating of the single astern pinion 6'.

What is claimed is:

1. Forward and reverse drive rotary machinery for use with a unidirectional driving member, the machinery incorporating a first hydraulic turbo coupling in a forward drive path and a second hydraulic turbo coupling in a reverse drive path, such that the torque developed by either turbo coupling when in rotation with its working circuit filled is opposed by the torque developed by the other turbo coupling when in rotation with its working circuit filled, the turbo couplings each being of the type comprising at least one pair of vaned rotors which are arranged as an impeller and a runner respectively and which define a working circuit wherein during normal operation of the turbo coupling liquid in the form of a vortex ring transmits power from one rotor to the other, the machinery also incorporating control means for selectively effecting the filling/emptying of the working circuit of the forward drive turbo coupling or of the reverse drive turbo coupling to establish selectively forward drive of the driven member of the machinery via the forward drive turbo coupling or reverse drive of the driven member via the reverse drive turbo coupling, the said control means having settings that include a forward drive setting in which the working circuit of the forward drive turbo coupling is substantially full to transmit torque from the driving member to the driven member and the working circuit of the reverse drive turbo coupling is effectively empty, a reverse drive setting in which the working circuit of the reverse drive turbo coupling is substantially full to transmit torque from the driving member to the driven member and the working circuit of the forward drive turbo coupling is effectively empty, and an additional setting in which the empty working circuit can fill and the full working circuit remains full, a change between said forward drive setting and said reverse drive setting involving passage of said control means through said additional setting.

2. Machinery according to claim 1 wherein movement of said control means from said additional setting to said forward drive setting effects the emptying of the working circuit of the reverse drive turbo coupling when it is in rotation, and movement of said control means from said additional setting to said reverse drive setting effects the emptying of the working circuit of the ahead drive turbo coupling when it is in rotation.

3. Machinery according to claim 1 wherein the working circuits of both turbo couplings are of high stalled torque capacity, being substantially devoid of sudden discontinuities in their boundaries.

4. Machinery according to claim 1 including delay means whereby passage of said control means from or through said additional setting to the forward drive setting or to the reverse drive setting as the case may be is delayed until the working circuit of the hitherto empty turbo coupling has become substantially full.

5. Machinery according to claim 4 wherein said delay means comprise detent means associated with the respective turbo couplings and arranged to be rendered inoperative when the hitherto empty working circuit of the associated turbo coupling has become substantially full, in response to the rise in pressure of working liquid delivered to said turbo coupling when its working circuit has become substantially full.

6. Machinery according to claim 1 wherein said control means have a neutral setting in which the working circuits of both turbo couplings are effectively empty, whereby said driving member can be in rotation without rotating said driven member.

7. Machinery according to claim 6 including means whereby passage of said control means from said neutral setting to the forward drive setting or to the reverse drive setting as the case may be is delayed until the working circuits of both turbo couplings have become substantially full.

8. Machinery according to claim 1 wherein the control means include a lever having forward drive and reverse drive settings and the aforesaid additional setting, a control valve for effecting the supply of working liquid to the forward drive turbo coupling when the lever is in the forward drive setting and also when the lever is in the aforesaid additional setting, and for effecting emptying of the forward drive turbo coupling when it is in rotation and the lever is in the reverse drive setting, and a control valve for effecting the supply of working liquid to the reverse drive turbo coupling when the lever is in the reverse drive setting and also when the lever is in the aforesaid additional setting, and for effecting emptying of the reverse drive turbo coupling when it is in rotation and the lever is in the forward drive setting.

9. Machinery according to claim 8 wherein said lever has a neutral setting wherein both control valves effect the emptying of their associated turbo couplings when they are in rotation.

10. Machinery according to claim 1 wherein said control means have two further settings in one of which, when the turbo couplings are in rotation, the working circuit of the forward drive turbo coupling is substantially full and there is a reduced degree of filling of the working circuit of the reverse drive turbo coupling, and in the other of which further settings, when the turbo couplings are in rotation, the working circuit of the reverse drive turbo coupling is substantially full and there is a reduced degree of filling of the working circuit of the forward drive turbo coupling, such that the torque transmitted by the turbo coupling the working circuit of which is substantially full is in excess of the torque transmitted by the turbo coupling in which the working circuit has a reduced degree of filling, whereby the driven member is rotated at a relatively low speed while the driving member is rotating at a relatively high speed.

References Cited

UNITED STATES PATENTS

| | | | |
|---|---|---|---|
| 2,976,689 | 3/1961 | Dodds et al. | 60—102 |
| 3,106,067 | 10/1963 | Darlington et al. | 60—102 |

EDGAR W. GEOGHEGAN, Primary Examiner

U.S. Cl. X.R.

60—54